(12) United States Patent
Iyer et al.

(10) Patent No.: US 10,853,255 B2
(45) Date of Patent: Dec. 1, 2020

(54) APPARATUS AND METHOD OF OPTIMIZING MEMORY TRANSACTIONS TO PERSISTENT MEMORY USING AN ARCHITECTURAL DATA MOVER

(71) Applicant: DELL PRODUCTS, LP, Round Rock, TX (US)

(72) Inventors: Shyamkumar T. Iyer, Austin, TX (US); Stuart Allen Berke, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 22 days.

(21) Appl. No.: 16/257,563

(22) Filed: Jan. 25, 2019

(65) Prior Publication Data
US 2020/0242040 A1   Jul. 30, 2020

(51) Int. Cl.
| G06F 12/00 | (2006.01) |
|---|---|
| G06F 12/0868 | (2016.01) |
| G06F 12/0804 | (2016.01) |
| G06F 12/0873 | (2016.01) |
| G06F 13/16 | (2006.01) |
| G06F 12/0891 | (2016.01) |

(52) U.S. Cl.
CPC ...... *G06F 12/0868* (2013.01); *G06F 12/0804* (2013.01); *G06F 12/0873* (2013.01); *G06F 12/0891* (2013.01); *G06F 13/1673* (2013.01); *G06F 2212/621* (2013.01); *G06F 2213/0026* (2013.01)

(58) Field of Classification Search
CPC ............ G06F 12/0868; G06F 12/0804; G06F 12/0873; G06F 13/1673; G06F 12/0891; G06F 2212/0621; G06F 2213/0026
See application file for complete search history.

(56) References Cited

U.S. PATENT DOCUMENTS

| 7,007,125 | B2 | 2/2006 | Barker et al. |
|---|---|---|---|
| 2007/0083728 | A1 | 4/2007 | Nijhawan et al. |
| 2014/0310430 | A1* | 10/2014 | Geddes ................. G06F 13/122 710/4 |
| 2015/0007187 | A1 | 1/2015 | Shows |
| 2018/0181530 | A1* | 6/2018 | Kantecki ............. G06F 13/4282 |

OTHER PUBLICATIONS

'NVM Express 1.2b', 2016, pp. 1-212, hereinafter NVMe (Year: 2016).*
'PCI Express Base Specification 2.01', 2009, (Year: 2009).*
An NVM Express Tutorial', by Kevin Marks, Dell Inc., 2013 (Year: 2013).*
Overview of Changes to PCI Express 3.0, 2016 (Year: 2016).*

* cited by examiner

*Primary Examiner* — Arvind Talukdar
(74) *Attorney, Agent, or Firm* — Larson Newman, LLP

(57) ABSTRACT

An information handling system with improved memory transactions includes a data mover configured to generate a transaction layer packet (TLP) hint when a descriptor includes a write operation to a persistent memory. A logic block may perform a persistent write based on the TLP hint.

20 Claims, 4 Drawing Sheets

APPARATUS AND METHOD OF OPTIMIZING MEMORY TRANSACTIONS TO PERSISTENT MEMORY USING AN ARCHITECTURAL DATA MOVER

FIELD OF THE DISCLOSURE

This disclosure generally relates to information handling systems, and more particularly relates to optimizing memory transactions to persistent memory using an architectural data mover.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a data mover that is configured to generate a transaction layer packet (TLP) hint when a descriptor includes a write operation to a persistent memory. A logic block performs a persistent write based on the TLP hint that is associated with the write operation.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings.

Figure 1:
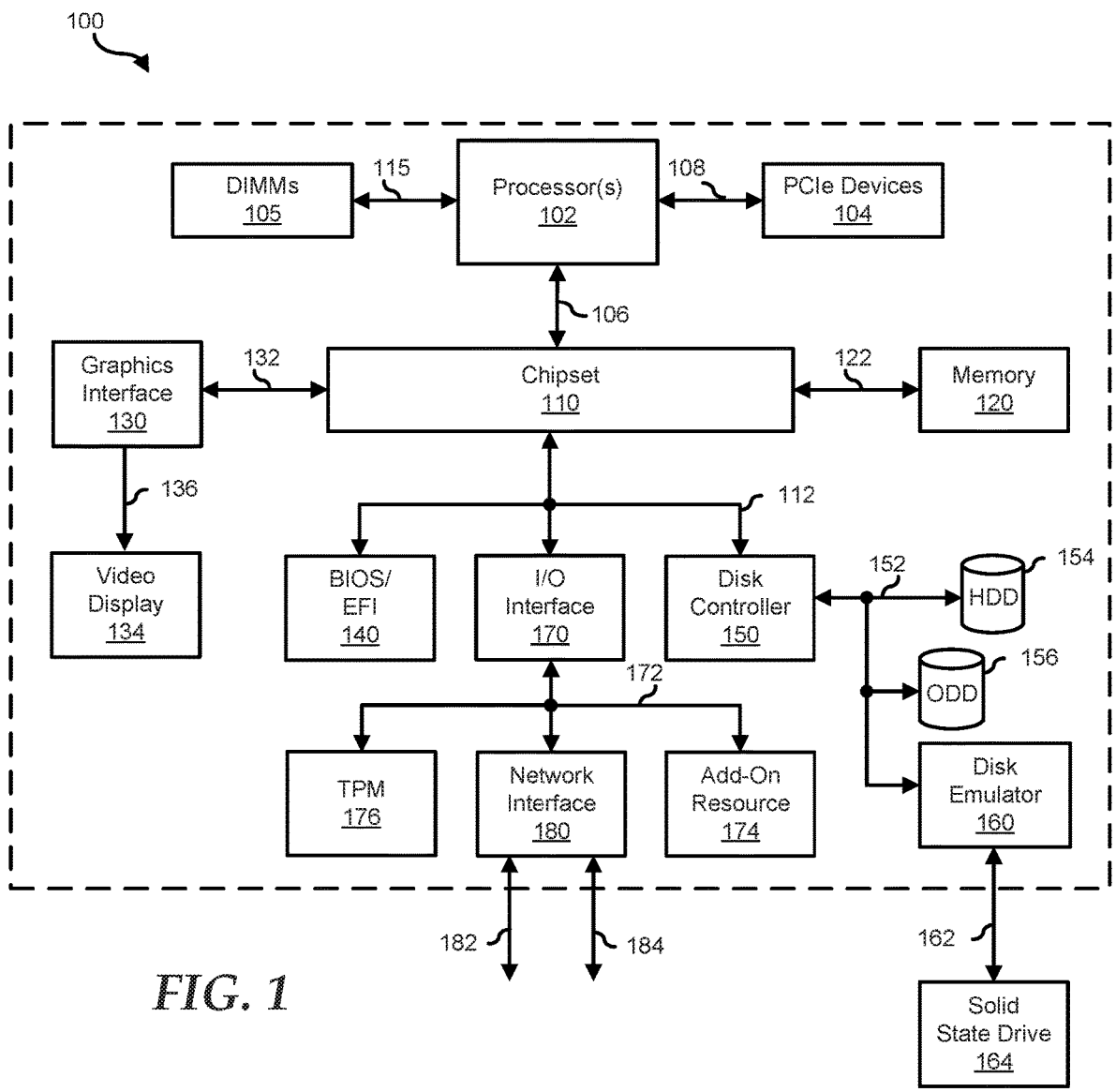
FIG. 1 is a block diagram of a generalized information handling system.

FIG. 1 illustrates a block diagram of information handling system 100. For purposes of this disclosure, the information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 100 can include processing resources for executing machine-executable code, such as a central processing unit (CPU), a programmable logic array (PLA), an embedded device such as a System-on-a-Chip (SoC), or other control logic hardware. Information handling system 100 can also include one or more computer-readable medium for storing machine-executable code, such as software or data. Additional components of the information handling system can include one or more storage devices that can store machine-executable code, one or more communications ports for communicating with external devices, and various input and output (I/O) devices, such as a keyboard, a mouse, and a video display. Information handling system can 100 also include one or more buses operable to transmit information between the various hardware components.

Information handling system 100 includes one or more processors 102, peripheral component interconnect express (PCIe) devices 104, one or more dual in-line memory modules (DIMMs) 105, a chipset 110, a memory 120, a graphics interface 130, include a basic input and output system/extensible firmware interface (BIOS/EFI) module 140, a disk controller 150, a disk emulator 160, an input/output (I/O) interface 170, and a network interface 180. Processor 102 is connected to chipset 110 via processor interface 106 and to the DIMMs 105 via DIMM interface 115, and the PCIe devices 104 are connected to the processor 102 via a PCIe interface 108. In an embodiment, the PCIe devices 104 are configurable via PCIe based configuration interface.

Memory 120 is connected to chipset 110 via a memory bus 122. Graphics interface 130 is connected to chipset 110 via a graphics interface 132, and provides a video display output 136 to a video display 134. In a particular embodiment, information handling system 100 includes separate memories that are dedicated to the processor 102 via a memory interface. An example of memory 120 includes random access memory (RAM) such as static RAM (SRAM), dynamic RAM (DRAM), non-volatile RAM (NV-RAM), read only memory (ROM), another type of memory, or a combination thereof.

BIOS/EFI module 140, disk controller 150, and I/O interface 170 are connected to chipset 110 via an I/O channel 112. An example of I/O channel 112 includes a Peripheral Component Interconnect (PCI) interface, a PCI-Extended (PCI-X) interface, a high speed PCIe interface, another industry standard or proprietary communication interface, or a combination thereof. Chipset 110 can also include one or more other I/O interfaces, including an Industry Standard Architecture (ISA) interface, a Small Computer Serial Interface (SCSI) interface, an Inter-Integrated Circuit (I²C) interface, a System Packet Interface (SPI), a Universal Serial Bus (USB), another interface, or a combination thereof. BIOS/EFI module 140 includes BIOS/EFI code operable to detect resources within information handling system 100, to provide drivers for the resources, initialize the resources, and access the resources. BIOS/EFI module 140 includes code that operates to detect resources within information handling system 100, to provide drivers for the resources, to initialize the resources, and to access the resources. In an embodiment, the BIOS/EFI module 140 may detect presence of persistent and non-persistent memories in the DIMMs 105.

Disk controller 150 is connected through a disk interface 152 to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a serial attached SCSI (SAS) interface, a non-volatile memory express (NVMe) interface, a USB interface, a proprietary interface, or a combination thereof. Disk emulator 160 permits a solid-state drive 164 to be connected to information handling system 100 via an external interface 162. An example of external interface 162 includes a USB interface, an IEEE 1394 (Firewire) interface, a proprietary interface, or a combination thereof. Alternatively, solid-state drive 164 can be disposed within information handling system 100. In an embodiment, the PCIe devices 104 may include architectural data mover, graphic processing units and storage devices such as solid state drives, including NVMe devices. In this embodiment, the data mover may be configured to autonomously perform data transfer from volatile or non-volatile source memories to volatile or non-volatile destination memories.

I/O interface 170 includes a peripheral interface 172 that connects the I/O interface to an add-on resource 174, to a trusted platform module (TPM) 176, and to network interface 180. Peripheral interface 172 can be the same type of interface as I/O channel 112, or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral channel 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a NIC disposed within information handling system 100, on a main circuit board of the information handling system, integrated onto another component such as chipset 110, in another suitable location, or a combination thereof. Network interface device 180 includes network channels 182 and 184 that provide interfaces to devices that are external to information handling system 100. In a particular embodiment, network channels 182 and 184 are of a different type than peripheral channel 172 and network interface 180 translates information from a format suitable to the peripheral channel to a format suitable to external devices. An example of network channels 182 and 184 includes InfiniBand channels, Fibre Channel channels, Gigabit Ethernet channels, proprietary channel architectures, or a combination thereof. Network channels 182 and 184 can be connected to external network resources (not illustrated). The network resource can include another information handling system, a data storage system, another network, a grid management system, another suitable resource, or a combination thereof.

Figure 2:
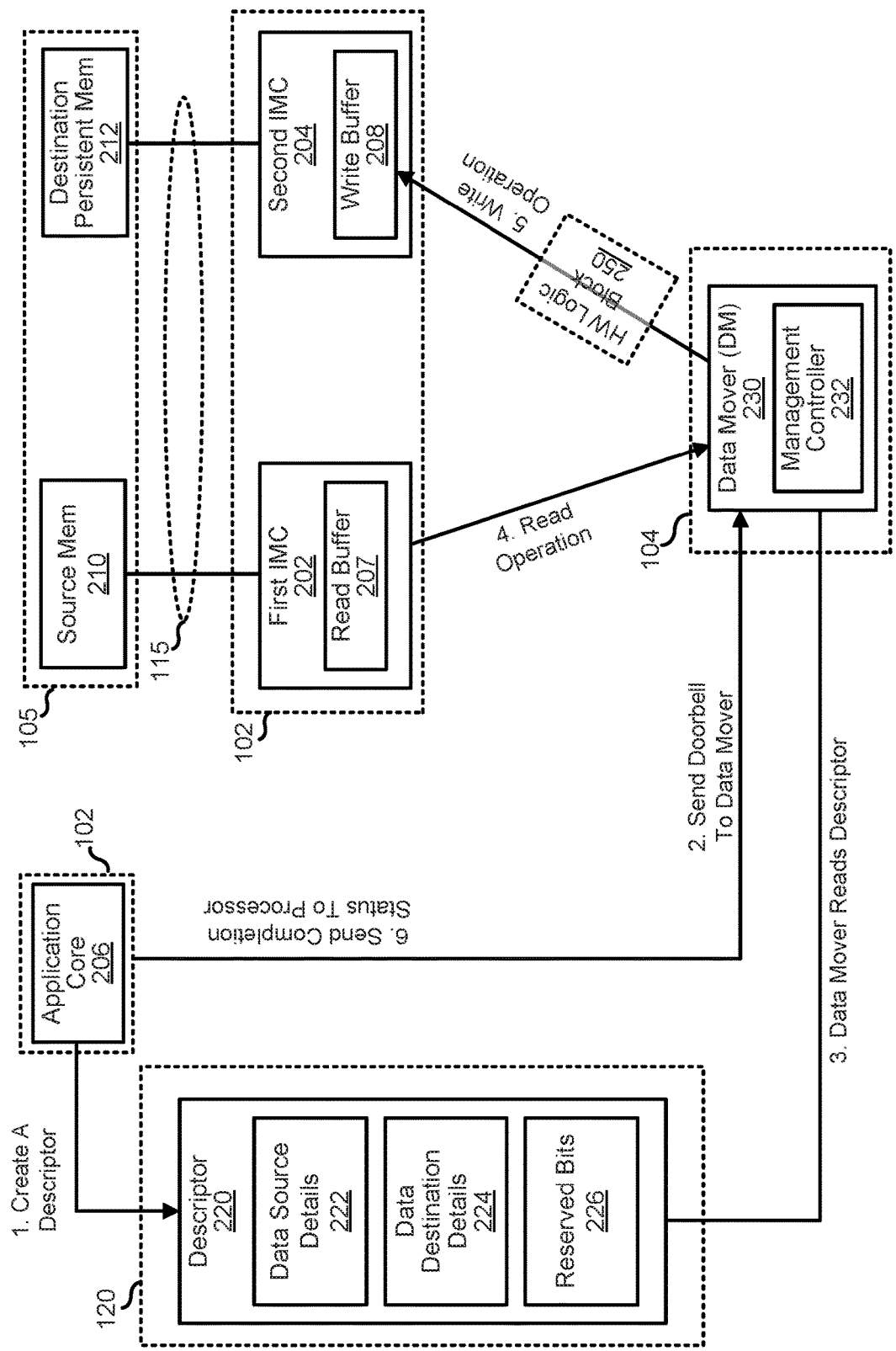
FIG. 2 is a block diagram of a portion of an information handling system supporting a generation of a TLP hint that facilitates an optimization of memory transactions to a persistent memory, according to an embodiment of the present disclosure.

FIG. 2 shows a portion of the information handling system 100 including the processor 102, PCIe device 104, DIMMs 105, and the memory 120. The processor 102 may include a first integrated memory controller (IMC) 202, a second IMC 204, and an application core 206. The first IMC 202 and the second IMC 204 may be connected to a source memory 210 and a destination persistent memory 212, respectively, of the DIMMs 105. In an embodiment, the application core 206 may be configured to write a move operation-descriptor such as a descriptor 220 that may be stored in the memory 120. In this embodiment, the application core 206 may send the actual descriptor or send a memory location of the descriptor to a data mover 230. The data mover reads the descriptor to determine whether it includes a write operation to a persistent memory. If so, the data mover may autonomously perform read operation to the source memory and the write operation to the persistent memory. In an embodiment, the data mover generates a TLP hint and associates this generated TLP hint to the write operation. A hardware (HW) logic block 250 interprets the TLP hint and based from the interpreted TLP hint, the HW logic block implements and guarantees persistent write during the write operation to the persistent memory. In this embodiment, the data mover may send a completion status to the application core and this completion status may indicate that all write data have been actually received by the persistent memory and no portion of the write data are cached, retained by the memory controllers, or yet to be flushed from buffers of the memory controllers.

In an embodiment, the first IMC 202 and the second IMC 204 may include read buffer 207 and write buffer 208, respectively, to implement the move operation-descriptor. The read buffer 207 includes a source memory buffer while the write buffer 208 includes a destination memory buffer. The read buffer may cache data bytes, words, chunks of data, or store read data of different sizes during read operation by the data mover. The write buffer may retain bytes, words, or data of various sizes that may be written to the persistent memory during write operation. In this embodiment, the read buffer and the write buffer are connected to the data mover 230 through a PCIe interface. That is, the data mover may perform the read operation to the source memory and the write operation to the persistent memory using the PCIe interface.

The application 206 may include one of the processing cores in the processor 102. In an embodiment, the application 206 may be configured to run software, program, or application that creates the descriptor that may be stored in the memory 120. The stored descriptor may be associated to an operation such as the move operation of data from the source memory to the persistent memory. In this case, the descriptor may include a command and other information that may be mapped to target a specific PCIe drive or device. The descriptor command, for example, includes reading by the data mover of the data range to the source memory and writing of the read data range to the destination memory. The other information of the descriptor may include source data range, write data destination range, reserved bits, header, footer, and the like, that may be used for the move operation. In this example, both source and destination memories may either be volatile or non-volatile memories.

With the stored descriptor in the memory, the processor 102 may send a doorbell to the data mover 230. The doorbell may indicate presence of the descriptor 220 in a submission queue slot of the memory 120. The submission queue slot is a circular buffer with a fixed slot size that the software, program, or application may use to submit the descriptor 220. In response to the received doorbell, the data mover 230 may send a command fetch to the memory 120. The memory is configured to send the descriptor to the data mover in response to the received command fetch. In an embodiment, the descriptor may include data transfer operations from the source memory 210 to the destination persistent memory 212. In this embodiment, the descriptor 220 may include data source details 222, data destination details 224, and reserved bits 226. The descriptor may further include header, footer, and other PCIe protocol attributes or fields, which are not shown for ease of illustration.

The data source details 222 and the destination details 224 may include attributes and other information that are specific to a descriptor operation or command. In an embodiment where the descriptor operation includes the data move operations from the source memory 210 to the destination persistent memory 212, the data source details may include an address range of data to be copied, source memory identification, etc. while the data destination details may include destination address range, destination memory identification, and the like. In this embodiment, the reserved bits 226 may include unused bits of TLP prefixes field of the PCIe protocol.

The data mover 230 may include an offload processor that may autonomously transfer data from one place to another memory location within the information handling system so as not to burden the processor 102 from performing these data transfers. In an embodiment, the data mover 230 includes a management controller 232 that reads the data source details 224 and the data destination details 222 of the fetched descriptor 220. Based from the read data destination details, the management controller may determine whether the destination memory includes the persistent memory. For example, destination memory address range from the data destination details 222 indicates that the target destination includes one or more physical regions of the persistent memory. When the target destination is determined to include the persistent memory, the management controller may leverage the use of existing TLP hint field of the PCIe protocol, use one of the reserved bits for the TLP hint bit, adds a new hint bit as the generated TLP hint bit, or leverage a vendor defined message to facilitate automatic persistent write. In this regard, the data mover through the management controller may facilitate memory transfer optimization by generating the TLP hint that facilitates automatic flushing or non-retaining of write data in the memory controllers.

In an embodiment, the management controller may use the existing TLP hint field in the PCIe protocol in order to generate the TLP hint that facilitates automatic persistent write during the write operations to the second IMC 204. In this embodiment, the management controller does not add, insert, or change, attributes or fields in the PCIe protocol but merely takes advantage of the existing TLP hint field and leverages this TLP hint field to generate the TLP hint that guaranty persistent write.

In another embodiment, management controller may use one of one of the reserved bits that may be found in the PCIe protocol as the TLP hint bit. For example, one of the reserved bits 226 may be configured to indicate the TLP hint bit. In this example, the TLP hint bit may be injected by management controller for the write operation to the persistent memory. In this other embodiment, the management controller utilizes a portion of the reserved fields in the PCIe protocol and associates the generated TLP hint to the write operation.

In another embodiment, a new hint field may be added on the descriptor 220 to indicate persistent write. In this other embodiment, the new hint field may represented by an additional bit that is configured to facilitate automatic persistent write. The automatic persistent write includes maintaining of a flushed state by the memory controllers. That is, all write data are automatically flushed and no data are retained in the write buffers during the write operation to the persistent memory. In an embodiment, the new hint field may be added to the existing PCIe protocol to indicate automatic persistent write during the write operations to the persistent memory.

In an embodiment, a PCIe vendor defined message may be defined in the PCIe protocol to indicate automatic persistent write. In this embodiment, the vendor defined message may be configured to include proprietary features to limit the use by other devices that may be connected to the architectural data mover such as the data mover 230. For example, the configured vendor defined message is sent across a particular PCIe channel. In this example, the receiving port should be able to interpret the vendor defined message in order to perform the automatic persistent write. Otherwise, the processor or CPU that includes the receiving port may not be able to utilize the architectural data mover.

In an embodiment, the generated TLP hint may be received by the HW logic block 250 that is disposed between the data mover and the second IMC 204. In this embodiment, the HW logic block is configured to interpret the generated TLP hint and facilitates implementation of the automatic persistent write. In other words, the destination persistent memory may use the HW logic block to interpret the TLP hint on its behalf, and to guide memory ordering of the write operation to the persistent memory. For example, the HW logic block receives the TLP hint from the data mover 230. The TLP hint is associated to destination range of the write data. In this example, the HW logic block is configured to observe logical mapping of the write data and to ensure the writing of the data directly to the destination range of the persistent memory without requiring additional flush instructions on the write buffers of the memory controllers. In other words, the HW logic block facilitates immediate flushing of write data in the write buffers.

After the write operation, the data mover may send the completion status to the processor 102. The completion status may guaranty that the persistent write has been fully completed and no data are retained in the write buffers or cache somewhere in the processors. From the point of view of the data mover, the completion status indicates that the actual write operations has been fully implemented.

Figure 3:
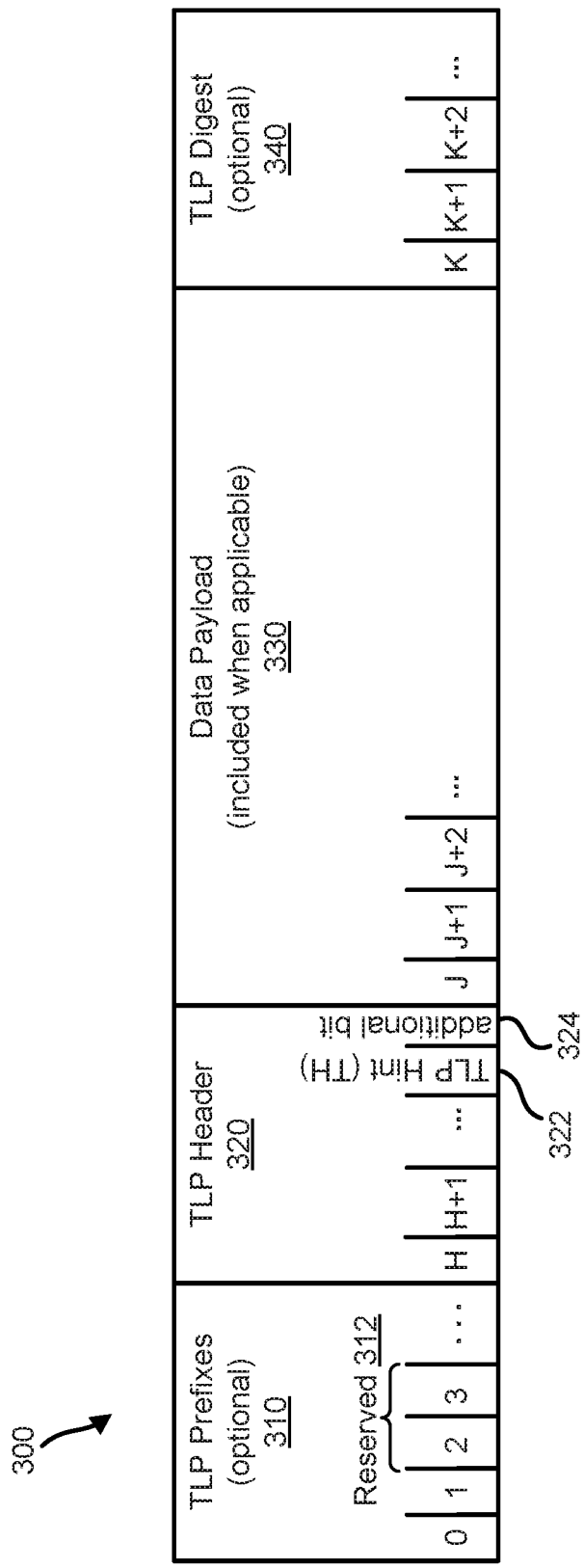
FIG. 3 is a block diagram of a transaction layer packet (TLP) that is used to implement the write operation, according to an embodiment of the present disclosure.

FIG. 3 shows a packet format overview 300 of the TLP that may be used during a write operation to the persistent memory. The packet format overview 300 may include TLP prefixes 310 with reserved bits 312, a TLP header 320 with TLP hint field 322 and an additional bit 324, data payload 330, and an optional TLP digest 340. The TLP prefixes 310 are optional additional information that may be prepended to the TLP. The TLP header 320 may include a format of the TLP, TLP type, length of associated data, address/routing information, and other attributes. The data payload 330 may include information that is destined for consumption by targeted function. For example, the write data may be included in the data payload 330. The TLP digest 340 are optional additional information at the end of the TLP.

When the descriptor includes the write operation to the persistent memory, the management controller may use of one of the reserved bits 312 for the TLP hint bit, leverage the use of existing TLP hint field 322 of the PCIe protocol as the generated TLP hint, or add a new hint bit 324 as the generated TLP hint bit. In this regard, the generated TLP hint facilitates automatic persistent write for the write operation. In other words, the HW logic block may interpret the generate TLP hint bit to indicate no-caching or retaining of the write data in the write buffers of the second IMC. The generated TLP hint may be equivalent to automatic issuance of CLFLUSH and PCOMMIT operations in the second IMC.

Figure 4:
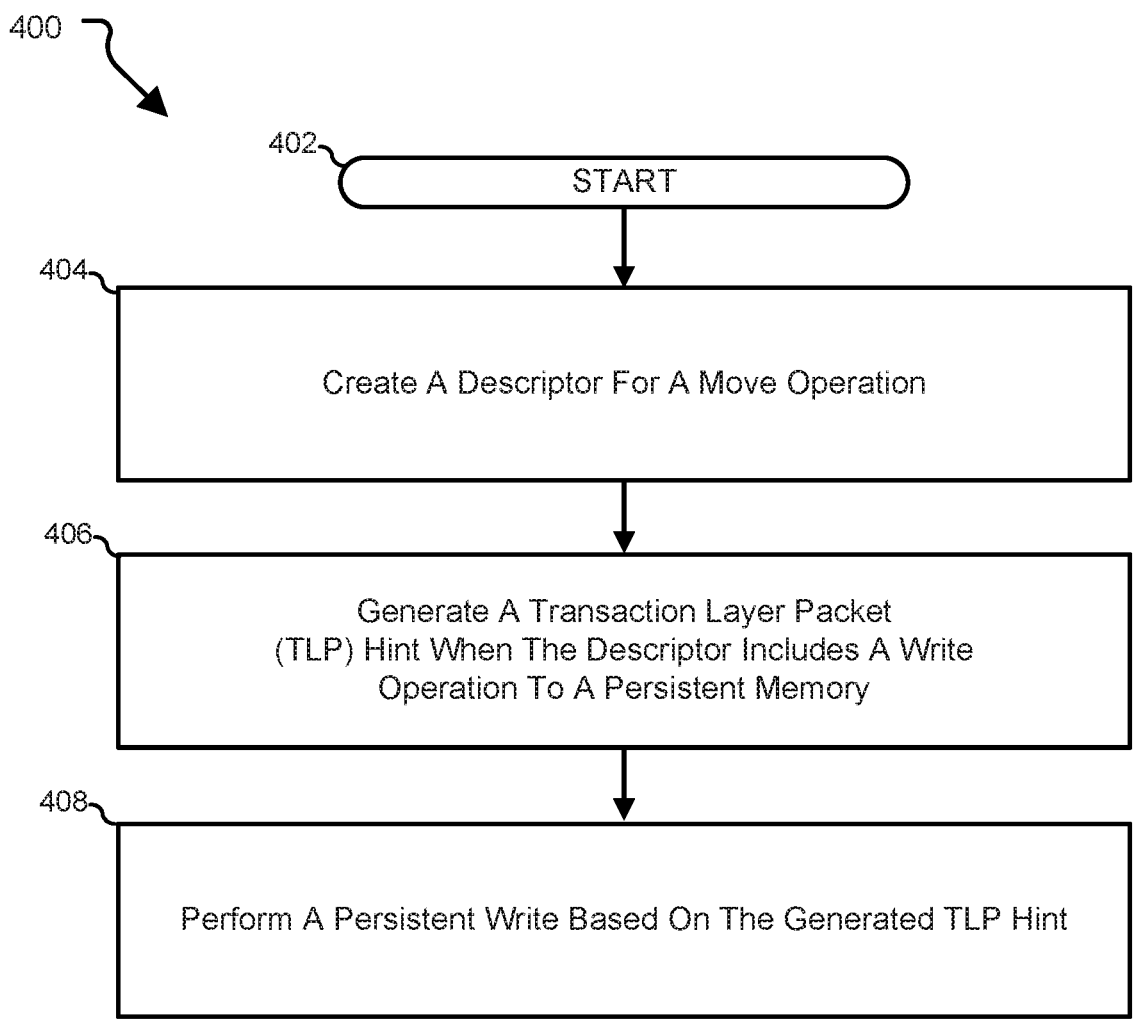
FIG. 4 is a flow chart showing a method of reducing latency in the information handling system by guarantying persistent write to the persistent memory, according to an embodiment of the present disclosure.

FIG. 4 shows a method 400 of optimizing memory transactions to persistent memory using an architectural data mover, starting at block 402. At block 404, the application core creates the descriptor 220 for the move operation. The application core may send doorbell to the data mover to indicate presence of the descriptor in the memory. At block 406, the data mover reads the descriptor and determines whether the target destination includes one or more physical regions of the persistent memory. If so, the data mover may generate the TLP hint. At block 408, the HW logic block interpret the generated TLP hint and performs the persistent write when the target destination includes the persistent memory.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents.

Devices, modules, resources, or programs that are in communication with one another need not be in continuous communication with each other, unless expressly specified otherwise. In addition, devices, modules, resources, or programs that are in communication with one another can communicate directly or indirectly through one or more intermediaries.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system having optimized memory transactions, comprising:

an application core of a processor, the application core is configured to create a descriptor;

a data mover to communicate with the application core, the data mover including a management controller that is configured to generate a transaction layer packet (TLP) hint when the descriptor includes a write operation to a persistent memory; and a hardware logic block disposed between the data mover and a memory controller of the processor, the hardware logic block configured to perform an automatic persistent write based from the TLP hint associated with the write operation, wherein the automatic persistent write to the persistent memory is performed without the processor performing the write operation.

2. The information handling system of claim 1, wherein the descriptor is created for a move operation that includes a read operation to a source memory and the write operation to the persistent memory.

3. The information handling system of claim 2, wherein the read and write operations are performed using a peripheral component interconnect express (PCIe) interface.

4. The information handling system of claim 2, wherein the data mover injects the TLP hint during the write operation.

5. The information handling system of claim 2, wherein the source memory includes a volatile or a non-volatile memory.

6. The information handling system of claim 1, wherein the data mover uses a reserve bit in TLP prefixes to generate the TLP hint.

7. The information handling system of claim 1, wherein the data mover creates an additional bit on a TLP header to generate the TLP hint.

8. The information handling system of claim 1, wherein the generated TLP hint includes use of an existing TLP hint field in a PCIe protocol.

9. The information handling system of claim 1, wherein the persistent write includes immediate flushing of data from write data buffers of memory controller that is associated with the persistent memory.

10. The information handling system of claim 1, wherein the data mover is configured to send a completion status to the application core, the completion status indicates that all data in write buffers are completely flushed to the persistent memory.

11. A method comprising:

creating, by an application core of a processor, a descriptor for a move operation;

generating, by a management controller of a data mover, a transaction layer packet (TLP) hint when the descriptor includes a write operation to a persistent memory; and performing, by a hardware logic block disposed between the data mover and a memory controller of the processor, an automatic persistent write based from the TLP hint associated with the write operation, wherein the automatic persistent write to the persistent memory is performed without the processor performing the write operation.

12. The method of claim 11, wherein the move operation includes a read and write operations that are performed using a peripheral component interconnect express (PCIe) interface.

13. The method of claim 12, wherein the data mover injects the TLP hint during the write operation to the persistent memory.

14. The method of claim 12, wherein the source memory includes a volatile or a non-volatile memory.

15. The method of claim 11, wherein the generating of the TLP hint includes using of a reserve bit in TLP prefixes for the TLP hint.

16. The method of claim 11, wherein the generating of the TLP hint includes creating an additional bit on a TLP header for the TLP hint.

17. The method of claim 16, wherein the additional bit includes the generated TLP hint in a PCIe protocol.

18. An information handling system having optimized memory transactions, comprising:
- an application core of a processor, the application core is configured to create a descriptor;
- a data mover to communicate with the application core, the data mover including a management controller that is configured to read the descriptor and to generate a transaction layer packet (TLP) hint when the descriptor includes a write operation to a persistent memory; and
- a hardware logic block disposed between the data mover and a memory controller of the processor, the hardware logic block that is configured to perform an automatic persistent write based from the TLP hint associated with the write operation, wherein the automatic persistent write to the persistent memory is performed without the processor performing the write operation.

19. The information handling system of claim 18, wherein the data mover uses a reserve bit in TLP prefixes to generate the TLP hint.

20. The information handling system of claim 18, wherein the data mover injects the TLP hint during the write operation to the persistent memory.

\* \* \* \* \*